(12) United States Patent  
Krause et al.

(10) Patent No.: US 7,404,190 B2
(45) Date of Patent: Jul. 22, 2008

(54) METHOD AND APPARATUS FOR PROVIDING NOTIFICATION VIA MULTIPLE COMPLETION QUEUE HANDLERS

(75) Inventors: Michael R. Krause, Boulder Creek, CA (US); Jeffrey R. Hilland, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 884 days.

(21) Appl. No.: 10/664,707

(22) Filed: Sep. 18, 2003

(65) Prior Publication Data

US 2005/0066333 A1 Mar. 24, 2005

(51) Int. Cl.
*G06F 3/00* (2006.01)
*G06F 9/44* (2006.01)
*G06F 9/46* (2006.01)
*G06F 13/00* (2006.01)
*G06F 15/167* (2006.01)
*G06F 13/28* (2006.01)

(52) U.S. Cl. ............... 719/318; 719/314; 709/212; 710/22

(58) Field of Classification Search ............... 718/100; 709/224, 212–216; 719/314, 318; 710/22; 711/100
See application file for complete search history.

(56) References Cited

U.S. PATENT DOCUMENTS

| 5,325,532 | A | 6/1994 | Crosswy et al. |
| 5,675,807 | A | 10/1997 | Iswandhi et al. |
| 5,737,604 | A | 4/1998 | Miller et al. |
| 5,751,932 | A | 5/1998 | Horst et al. |
| 5,809,285 | A | 9/1998 | Hilland |
| 5,815,707 | A | 9/1998 | Krause et al. |
| 5,822,571 | A | 10/1998 | Goodrum et al. |
| 5,870,568 | A | 2/1999 | Culley et al. |
| 5,872,941 | A | 2/1999 | Goodrum et al. |
| 5,914,953 | A | 6/1999 | Krause et al. |
| 5,948,111 | A | 9/1999 | Taylor et al. |
| 5,964,835 | A | 10/1999 | Fowler et al. |
| 5,978,858 | A | 11/1999 | Bonola et al. |
| 5,983,269 | A | 11/1999 | Mattson et al. |
| 6,018,620 | A | 1/2000 | Culley et al. |
| 6,038,621 | A | 3/2000 | Gale et al. |
| 6,047,323 | A | 4/2000 | Krause |
| 6,070,189 | A | * 5/2000 | Bender et al. ............... 709/224 |
| 6,070,198 | A | 5/2000 | Krause et al. |
| 6,070,253 | A | 5/2000 | Tavallaei et al. |
| 6,157,967 | A | 12/2000 | Horst et al. |
| 6,163,834 | A | 12/2000 | Garcia et al. |
| 6,233,702 | B1 | 5/2001 | Horst et al. |
| 6,289,023 | B1 | 9/2001 | Dowling et al. |

(Continued)

OTHER PUBLICATIONS

Recio, Renato "RDMA enabled NIC Verbs Overview" RDMA Consortium, Apr. 29, 2003.*

(Continued)

*Primary Examiner*—Thomas Lee
*Assistant Examiner*—Qing-Yuan Wu (57) ABSTRACT

The disclosed embodiments relate to a method and apparatus for providing notification. The apparatus may comprise a plurality of completion queue handlers associated with a communication device. Each of the plurality of completion queue handlers may be associated with a plurality of processes. At least one completion queue may be associated with at least one of the plurality of completion queue handlers.

15 Claims, 4 Drawing Sheets

U.S. PATENT DOCUMENTS

| | | | |
|---|---|---|---|
| 6,484,208 | B1 | 11/2002 | Hilland |
| 6,493,343 | B1 | 12/2002 | Garcia et al. |
| 6,496,940 | B1 | 12/2002 | Horst et al. |
| 6,502,203 | B2 | 12/2002 | Barron et al. |
| 6,594,712 | B1 * | 7/2003 | Pettey et al. ................. 710/22 |
| 6,718,370 | B1 * | 4/2004 | Coffman et al. ............ 709/212 |
| 6,990,528 | B1 * | 1/2006 | Neal et al. .................. 709/232 |
| 7,103,888 | B1 * | 9/2006 | Cayton et al. ............... 719/313 |
| 7,136,907 | B1 * | 11/2006 | Nordstrom et al. .......... 709/220 |
| 7,299,266 | B2 * | 11/2007 | Boyd et al. ................. 709/213 |
| 2002/0124117 | A1 * | 9/2002 | Beukema et al. ............ 709/314 |
| 2003/0050990 | A1 * | 3/2003 | Craddock et al. ........... 709/212 |
| 2003/0061296 | A1 * | 3/2003 | Craddock et al. ........... 709/212 |
| 2004/0010594 | A1 * | 1/2004 | Boyd et al. ................. 709/227 |
| 2004/0034725 | A1 * | 2/2004 | Elzur .......................... 710/22 |
| 2006/0129699 | A1 * | 6/2006 | Kagan et al. ................ 709/250 |

OTHER PUBLICATIONS

U.S. Appl. No. 10/400,313, filed Mar. 27, 2003, entitled Protection Domain Groups, Inventor: Jeffrey R. Hilland et al.

U.S. Appl. No. 10/401,234, filed Mar. 27, 2003, entitled Queue Pair/Window Association, Inventor: David J. Garcia et al.

U.S. Appl. No. 10/401,232, filed Mar. 27, 2003, entitled Physical Mode Addressing, Inventor: Kathryn Hampton et al.

U.S. Appl. No. 10/401,230, filed Mar. 27, 2003, entitled Physical Mode Windows, Inventor: David J. Garcia et al.

U.S. Appl. No. 10/401,237, filed Mar. 27, 2003, entitled Method and Apparatus for Performing Connection Management with Multiple Stacks, Inventor: Prashant Modi et al.

U.S. Appl. No. 10/401,233, filed Mar. 27, 2003, entitled Atomic Operations, Inventor: Dwight L. Barron et al.

U.S. Appl. No. 10/401,236, filed Mar. 27, 2003, entitled Signal Packet, Inventor: Dwight L. Barron.

U.S. Appl. No. 10/401,231, filed Mar. 27, 2003, entitled Shared Receive Queues, Inventor: Mallikarjun Chadalapaka et al.

U.S. Appl. No. 10/401,235, filed Mar. 27, 2003, entitled Binding A Memory Window to A Queue Pair, Inventor: David J. Garcia et al.

U.S. Appl. No. 10/641,127, filed Aug. 14, 2003, entitled Method and Apparatus For Accessing A Memory, Inventor: Mallikarjan Chadalapaka.

U.S. Appl. No. 10/641,129, filed Aug. 14, 2003, entitled Method and Apparatus For Implementing Work Request Lists, Inventors: Jeffrey R. Hilland et al.

Jeffrey R. Hilland et al., "RDMA Protocol Verbs Specification (Version 1.0)" (Apr. 2003).

* cited by examiner

METHOD AND APPARATUS FOR PROVIDING NOTIFICATION VIA MULTIPLE COMPLETION QUEUE HANDLERS

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. Queue pairs ("QPs") may be used to facilitate such a transfer of data. Each QP may include a send queue ("SQ") and a receive queue ("RQ") that may be utilized in transferring data from the memory of one device to the memory of another device. The RQ or the SQ may be associated with a completion queue ("CQ") or different CQs. To notify the process that an event has completed, a CQ handler may be utilized to interact between the CQ or CQs and an application or consumer. For example, a CQ handler may notify the consumer that an operation has been completed with the information in the CQ relating to that event.

However, in a computing environment, the number interconnects and speed of the transactions continue to increase. Within a network interface, a single CQ handler may be used for that interface. The single CQ handler may be a bottleneck when for a large set of QPs. This may result in skewed performance, which is exhibited as erratic or inefficient system behavior. With multiple network interfaces or a large set of QPs on an interface, these inefficiencies may degrade the overall system performance.

BRIEF DESCRIPTION OF THE DRAWINGS

The foregoing and other advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve the ability of computer systems to remotely access the memory of other computer systems. One such specification under development is the RDMA Consortium Protocols Verb specification, which is hereby incorporated by reference. The verbs defined by this specification may correspond to commands or actions that may form a command interface for data transfers between memories in computer systems, including the formation and management of queue pairs, memory windows, protection domains and the like.

RDMA may refer to the ability of one system to directly place information in the memory space of another system, while minimizing demands on the central processing unit ("CPU") and memory bus. While the embodiments may utilize RDMA, other suitable technologies, such as Infiniband or the like, may be implemented as well. The systems may be computer systems, storage controllers, appliances, routers, layer 4 switches, I/O modules, or the like. In an RDMA system, an RDMA layer may interoperate over any physical or wireless layer in a Local Area Network ("LAN"), Server Area Network ("SAN"), Metropolitan Area Network ("MAN"), Wide Area Network ("WAN"), backplane, bus, or as a loopback operation.

Figure 1:
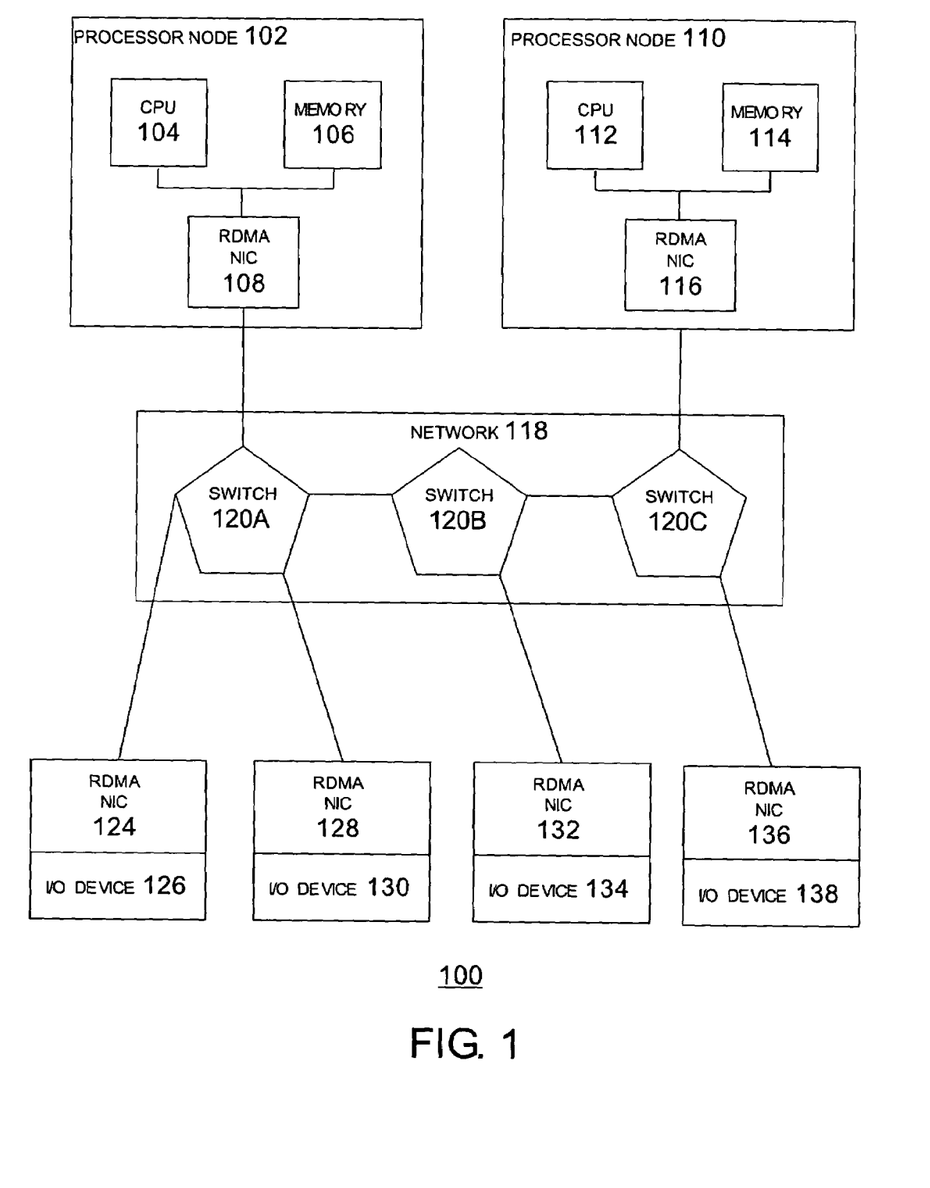
FIG. 1 is a block diagram illustrating a computer network in accordance with embodiments of the present invention.

Referring now to FIG. 1, a block diagram illustrating a network in accordance with embodiments of the present invention is illustrated. The network is indicated by the reference numeral 100 and may comprise a first processor node 102 and a second processor node 110, which may be connected to a plurality of input/output ("I/O") devices 126, 130, 134, and 138 via a switch network 118. Each of the I/O devices 126, 130, 134 and 138 may utilize a Remote Direct Memory Access-enabled Network Interface Card ("RNIC") to communicate with the other systems. In FIG. 1, the RNICs associated with the I/O devices 126, 130, 134 and 138 are identified by the reference numerals 124, 128, 132 and 136, respectively. The I/O devices 126, 130, 134, and 138 may access the memory space of other RDMA-enabled devices via their respective RNICs and the switch network 118.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. Also, the CPU 104 may be a processing element, state machine, or the like. The CPU 104 may be connected to the memory 106 and the RNIC 108 over an internal bus or connection. The memory 106 may be utilized to store information for use by the CPU 104, the RNIC 108 or other systems or devices. The memory 106, which may be integrated into the CPU 104, may include memory controllers and various types of memory such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112, which may include a plurality of processors, may be connected to the memory 114 and the RNIC 116 over an internal bus or connection. The memory 114 may be utilized to store information for use by the CPU 112, the RNIC 116 or other systems or devices. The memory 114 may utilize various types of memory such as SRAM or DRAM.

The switch network 118 may include any combination of hubs, switches, routers point to point links, and the like. In FIG. 1, the switch network 118 comprises switches 120A-120C. The switch 120A connects to the switch 120B, the RNIC 108 of the first processor node 102, the RNIC 124 of the I/O device 126 and the RNIC 128 of the I/O device 130. The IO devices may be any variant from a traditional IO device to a bridge, route or other translation device or even loopback. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given access to the memory 106 or 114. In addition, the memories may be accessible by remote devices such as the I/O devices 126, 130, 134 and 138 via the switch network 118. The first processor node 102, the second processor node 110 and the I/O devices 126, 130, 134 and 138 may exchange information using queue pairs ("QPs"). The exchange of information using QPs and associated CQs is explained with reference to FIG. 2.

Figure 2:
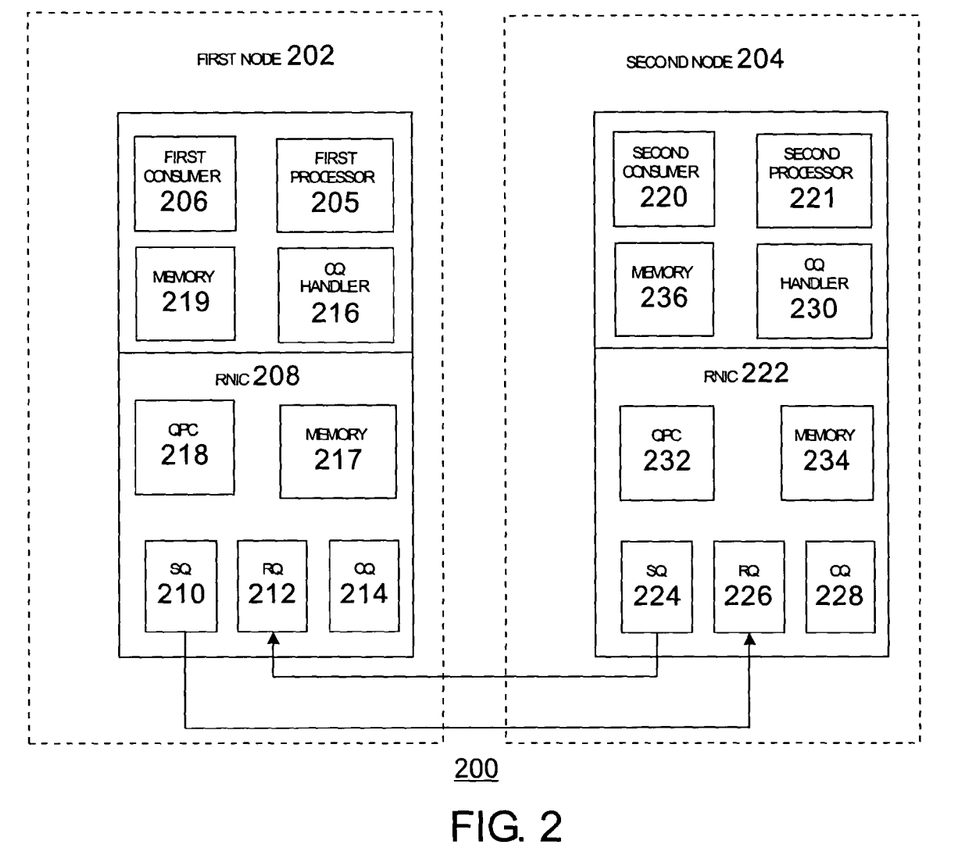
FIG. 2 is a block diagram that illustrates the use of a queue pair to transfer data between devices in accordance with an embodiment of the present invention.

FIG. 2 is a block diagram that illustrates the use of a queue pair and completion queues to transfer data between devices in accordance with embodiments of the present invention. The figure is generally referred to by the reference numeral 200. In FIG. 2, a first node 202 and a second node 204 may exchange information using a QP. The first node 202 and second node 204 may correspond to any two of the first processor node 102, the second processor node 110 or the I/O devices 126, 130, 134 and 138 (FIG. 1). As set forth above with respect to FIG. 1, any of these devices may exchange information in an RDMA environment.

The first node 202 may include a first processor 205 that operates a first consumer 206 that interacts with an RNIC 208. The first consumer 206 may comprise a software, firmware, or silicon process or application that may interact with various components, such as memory 219, a CQ handler 216 and the RNIC 208. The memory 219 may be a portion of the memory 106 or 114 of FIG. 1 that is within the first node 202, while the CQ handler 216 may be a routine located in the memory 219 or other construct that exchanges information from the RNIC 208 to the first processor 205. The RNIC 208, may correspond to one of the RNICs 108, 116, 124, 128, 132 or 136 (FIG. 1), depending on which of the devices associated with those RNICs is participating in the data transfer. The RNIC 208 may comprise a send queue ("SQ") 210, a receive queue ("RQ") 212, a completion queue ("CQ") 214, a memory 217, and a QP context ("QPC") 218. The memory 217 may be a separate portion of memory located within the RNIC 208 or other accessible component.

The second node 204 may include a second processor 221 that operates a second consumer 220, which may interact with an RNIC 222. The second consumer 220 may comprise a software process that may interact with various components, such as a memory 236, a completion queue handler 230 and/or an RNIC 222. The memory 236 may correspond to a portion of the memories 106 or 114 of FIG. 1 within the second node 204, while the CQ handler 230 may be a routine located in the memory 236 that exchanges information from the RNIC 222 to the second processor 221. The RNIC 222, may correspond to one of the RNICs 108, 116, 124, 128, 132 or 136 (FIG. 1), depending on which of devices associated with those RNICs is participating in the data transfer. The RNIC 222 may comprise a send queue ("SQ") 224, a receive queue ("RQ") 226, a completion queue ("CQ") 228, a memory 234 and a QP context ("QPC") 232. The memory 234 may be a separate portion of memory within the RNIC 222.

The memories 217, 219, 234, and 236 may be registered to different processes, each of which may correspond to the consumers 206 and 220. The queues 210, 212, 224, or 226 may be used to transmit and receive various verbs or commands, such as control operations or transfer operations. The completion queue 214 or 228 may store information regarding the sending status of items on the send queue 210 or 224 and receiving status of items on the receive queue 212 or 226 that may be stored within the memories 217, 219, 234, and 236. The CQ handler 216 or 230 may send an interrupt or interrupt signal to the processor 205 or 221 that is operating the consumer 206 or 220. The CQ handlers 216 and 230 may be stored in the memories 217, 219, 234, and 236. The interrupt signal may include information that informs the consumer 206 or 220 that an operation has completed or that information is available, which may awaken a blocked process, for example. While the CQ 214 or 228 may comprise at least a portion of the completion mechanism for the QP, the CQ handlers 216 and 230 may comprise the completion notification mechanism for a completed operation or request that has been posted to the CQ 214 or 228 for notification of the associated process or equivalent construct.

The QP associated with the RNIC 208 may comprise the send queue 210 and the receive queue 212. The QP associated with the RNIC 222 may comprise the send queue 224 and the receive queue 226. The arrows between the send queue 210 and the receive queue 226 and between the send queue 224 and the receive queue 212 indicate the flow of data or information therebetween. Before communication between the RNICs 208 and 222 (and their associated QPs) may occur, the QPs may be established and configured by an exchange of commands or verbs between the RNIC 208 and the RNIC 222 as well as between the consumer 206 or 220 and the RNIC 208 or 222. The creation of the QP may be initiated by the first consumer 206 or the second consumer 220, depending on which consumer desires to transfer data to or retrieve data from the other consumer.

Information relating to the configuration of the QPs may be stored in the QP context 218 of the RNIC 208 and the QP context 232 of the RNIC 222. For instance, the QP context 218 or 232 may include information relating to a protection domain ("PD"), access rights, send queue information, receive queue information, completion queue information, completion queue handler information or information about a local port connected to the QP and/or remote port connected to the QP. However, it should be appreciated that the RNICs 208 and/or 222 may include multiple QPs that support different consumers with the QPs being associated with one of a number of CQs.

To improve performance, embodiments of the present invention may employ multiple CQ handlers for each of the RNICs 208 and 222. The use of multiple CQ handlers for each RNIC 208 or 222 provides the benefits of flexibility in the association of the CQs with a processor, reduction in the total cost of ownership through process automation, and simplification of resource utilization, which may enhance performance of the system. Indeed, each CQ handler 216 or 230 may interact with a specific processor or consumer to disburse the workload among other processors or consumers. By segregating the workload distribution, the CQ handlers may improve cache efficiency, memory bus utilization, and consumer responsiveness. In addition, the multiple CQ handlers may provide the opportunity to prioritize CQ handlers per processor by adjusting the resources that are provided. These adjustments may be implemented through the use of the verbs discussed above, which may allow the system to enhance performance by managing the CQs and the processors that are utilized with the CQ handlers and multiple interrupts per RNIC. These benefits are further explained below in FIG. 3, which describes the interaction between multiple QPs, CQs, CQ handlers and processors.

Figure 3:
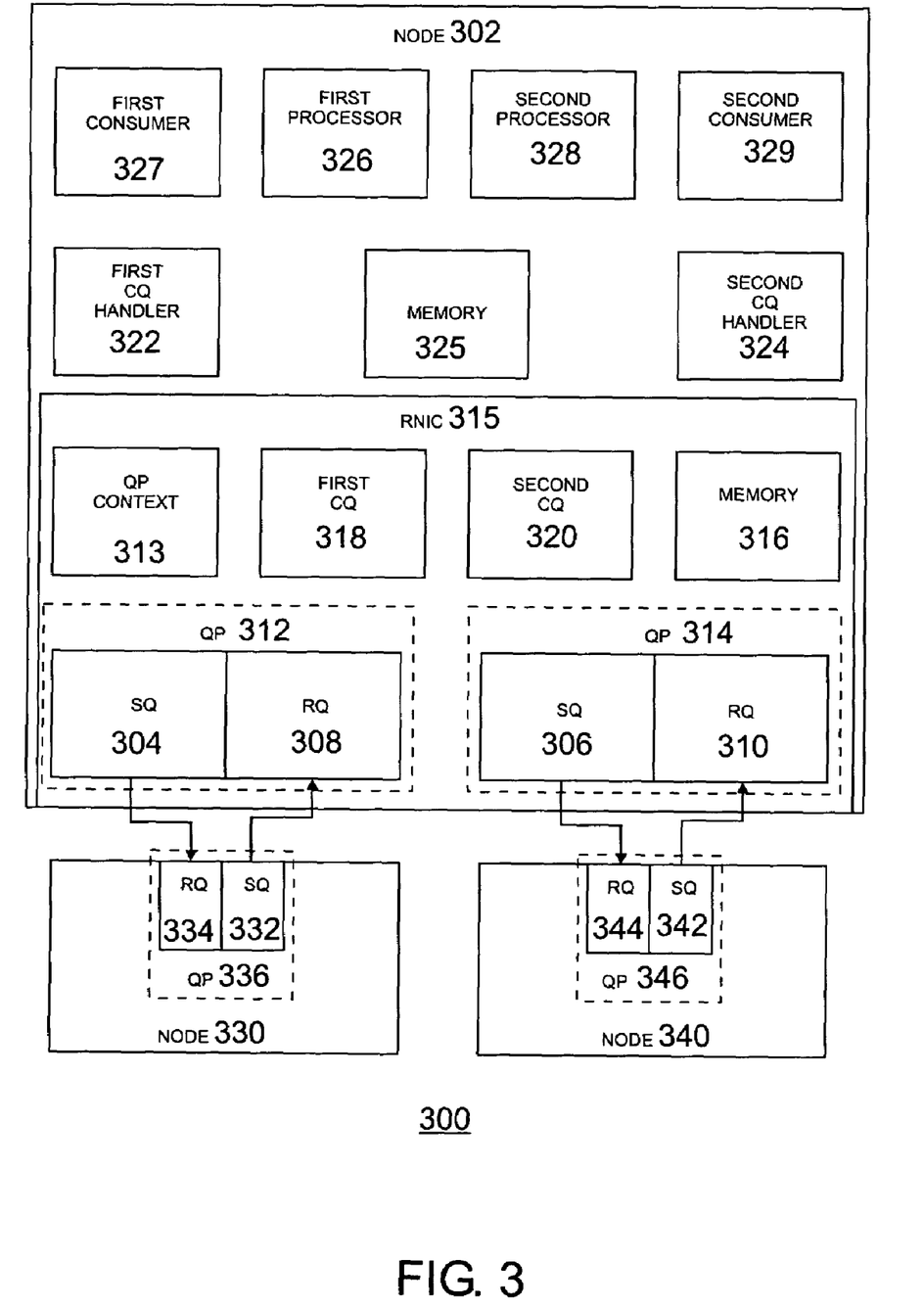
FIG. 3 is a block diagram illustrating data exchange using multiple completion queue handlers in accordance with an embodiment of the present invention.

FIG. 3 is a block diagram illustrating data exchange using multiple completion queue handlers in accordance with embodiments of the present invention. The diagram is generally referred to by the reference numeral 300. Processes or applications, which may be referred to as a first consumer 327 and a second consumer 329, may correspond to the consumers 206 or 220 of FIG. 2. The consumers 327 and 329 may operate on a node 302, which may correspond to one of the nodes 202 or 204 of FIG. 2. The node 302 may include an RNIC 315 that has a first send queue 304, a second send queue 306, a first receive queue 308, and a second receive queue 310. The first send queue 306 and first receive queue 308 may comprise a first QP 312. The second send queue 306 and the second receive queue 310 may comprise a second QP 314. Also, a QP context 313 may correspond to the QP context 218 or 232 of FIG. 2. The use of two sets of send queues and receive queues indicates that two sets of QPs have been established for communication between the node 302 and other devices.

The QPs 312 and 314 may be associated with different completion queues ("CQs") 318 and 320, which may correspond to the CQ 214 or 228 of FIG. 2. The CQs 318 and 320 may be associated with CQ handlers 322 and 324, which may correspond to the CQ handlers 216 or 230 of FIG. 2. The QP 312 may be associated with CQ 318, while the QP 314 may be associated with CQ 320. Also, the CQs 318 and 320 may interact with a processor 326 or 328 through the CQ handler 322 or 324 to operate a consumer 327 or 329. With multiple CQ handlers 322 and 324, each CQ 318 or 320 and QP 312 or 314 associated with a consumer 327 or 329 may be associated with a specific processor 326 or 328.

The QPs 312 and 314 and CQs 318 and 320 may be associated with different processors 326 and 328 in some situations. For instance, the QP 312, the first CQ 318, and the first CQ handler 322 may be associated with the first processor 326 and first consumer 327. Likewise, the QP 314, the second CQ 320, and the second CQ handler 324 may be associated with the second processor 328 and second consumer 329. By associating the CQs 318 and 320 with different processors 326 and 328, the specific QP 312 or 314 may be managed by the processor 326 and 328 to provide improved service to a specific process. The improved service may include providing a higher quality of service, dedicated interaction, distributed access to reduce bottlenecks, or other similar benefits. As another example, the QPs 312 and 314 and CQs 318 and 320 may be associated with same processor 326 or 328. In this example, the QPs 312, the first CQ 318, and the first CQ handler 322 are associated with the first processor 326 and first consumer 327. Likewise, the QP 314, the second CQ 320, and the second CQ handler 324 may also be associated with the first processor 326 and second consumer 329. By associating the CQs 318 and 320 with the same processor 326, a single processor may be able to manage a group of associated processes and inefficient data exchanges between the different processes. As such, the flexibility of the associations between the CQs 318 and 320 and the consumers 327 or 329, the QPs 312 and 314 may be managed to interact with a specific processor 326 or 328 that may provide benefits to the node's operation.

To improve performance in the node 302, communication protocols, such as the Peripheral Component Interconnect ("PCI"), Extended PCI ("PCI-X"), PCI Express, or the like, may be implemented in buses and bridges, which may be utilized in I/O transactions between peripheral devices, such as RNIC 315, and the processors 326 and 328. For instance, with PCI, PCI-X, and/or PCI Express, the CQ handlers 322 and 324 in the RNIC 315 may be assigned sections of the memory, such as memory 316 or 325, for use by the CQ handlers 318 and 320 to ensure they have the resources needed to operate efficiently. The communication between CQ handlers 322 and 324 and the processors 326 and 328 or other devices may be managed by PCI, PCI-X, PCI-Express, or the like, which handles interrupt requests and the ports used for communicating. It should be noted that the interrupt may cause an event to be generated, which may be the result from an interrupt messages or completion event, for example. As another beneficial feature, messaged based interrupt schemes, such as Message Signaled Interrupts ("MSI") and Extended MSI ("MSI-X"), may be employed to enable a node 302 to associate different interrupts with each CQ handler 322 or 324. MSI and MSI-X operate by allowing interrupts to be indicated by writing data to a pre-determined address.

Beneficially, embodiments of the present invention may provide the ability to segregate CQ handlers 322 and 324 to target a consumer 327 or 329 or processor 326 or 328. For instance, the segregation may improve cache efficiency or memory bus utilization because the CQ handler 322 or 324 reduces cache line invalidation and eviction and unnecessary memory bus overhead, which may be associated with synchronizing access to memory locations. For instance, by targeting a specific processor 326 or 328, the CQ handlers 322 and 324 may be directed to processor 326 for consumer 327 and processor 328 for consumer 329, which may reduce the exchanges of data and cache information if the RNIC 315 communicated with the processor 326 for both consumer 327 and 329. Advantageously, the segregation may improve the efficiency of the system by spreading the CQ handler 322 or 324 exchanges between multiple processors 326 and 328. This improved efficiency allows the high interactive periods to be disbursed, which may result in more efficient and responsive systems.

In addition, the multiple CQ handlers 322 or 324 on an RNIC 315 may provide the opportunity to prioritize CQ handlers 322 or 324 per processor 326 or 328. This prioritization allows node 302 to provide a quality of service type of policy for different events or operations. For instance, a low latency event may be treated as a higher priority over other events that are not time sensitive. Accordingly, a process-specific grouping of functions or events may be processed according to a policy or class-based service for different consumers 327 or 329 or processors 326 or 328. This allows the system to more efficiently manage the arbitration of different events and operation of processes and applications.

To utilize the multiple CQ handlers 322 and 324, verbs may be utilized to create and manage the CQ handlers 322 or 324 or the CQ 318 or 320. For instance, a "Query RNIC" verb may display the number of CQ handlers 322 or 324 that may be associated with the RNIC 315. If a single CQ event handler 322 or 324 is supported, then the verb will return that one CQ handler 322 or 324 is supported by the RNIC. However, if multiple CQ handlers 322 and 324 are supported by the RNIC, then the verb will return the number of CQ handlers supported by the RNIC, such as two CQ handlers 322 and 324 as shown. Also, a "createCQ" verb may include an input modifier, such as a completion handler identifier, to associate a CQ handler 322 or 324 with a CQ 318 or 320. The completion handler identifier may be a number that associates the CQ 318 or 320 with the CQ handler 322 or 324. In using this verb, the CQ handler 322 may be associated with the CQ 318, or the CQ handler 322 may be associated with CQs 318 and 320, for example. Further, a "modifyCQ" verb may allow the associated CQ handler 322 or 324 to be updated. With this verb, the CQ handler 322 may be modified to associate with another CQ 318 or 320, or to remove an association with a CQ 318 or 320. Moreover, a "Set Completion Handler" verb may register the CQ handler 322 or 324 with the RNIC 315. The verb may set a single or multiple CQ handlers 322 or 324 to be associated with the RNIC 315.

Once the CQ 318 and 320 and CQ handlers 322 and 324 are created, the QP 312 may be adapted to exchange information with a corresponding QP 336, which may comprise a send queue 332 and a receive queue 334. The QP 336 may be located in a node 330, which may correspond to a device with which the node 302 is exchanging information. The arrows between the send queue 304 and the receive queue 334 and between the send queue 332 and the receive queue 308 indicate the flow of information therebetween. Similarly, the QP 314 may be adapted to exchange information with a corresponding QP 346, which may comprise a send queue 342 and a receive queue 344. The QP 346 may be located in a node 340, which may correspond to a device with which the node 302 is exchanging information. The arrows between the send queue 306 and the receive queue 344 and between the send queue 342 and the receive queue 310 indicate the flow of information therebetween.

In an exemplary communication with the node 302, the nodes 330 and 340 may exchange requests. A request may include a verb or command that results in the generation of a work request ("WR"). The WR may include a list of memory locations from which data is intended to be read or written. The processing of a WR may result in the creation of a work queue element ("WQE"), which may be posted to the appropriate queue for the command to be performed. Once the WQE completes execution, a completion queue element ("CQE") is created on the respective CQ 318 or 320 for the SQ 304 or 306 or RQ 308 or 310. The CQE may reside in the memory 316 or 325 and include information used to associate the CQE with a previously-issued work request. The creation of a CQE may invoke the CQ handler 322 or 324 that is used to notify the associated consumer 327 or 329 and/or processor 326 or 328.

In an exemplary communication with the node 302, the nodes 330 and 340 may send a request to the node 302. The QP 312 and QP 314 may be associated with CQ 318 and 320, respectively. The CQ 318 may be associated with CQ handler 322, while CQ 320 is associated with CQ handler 324. The CQ handler 322 may be associated with the first consumer 327, which may involve inter-process communications ("IPCs"), through a completion handler identification. The completion handler identification may be a specific number, such as "1" that associates the CQ handler 322 or 324 with a CQ 318 or 320. The CQ handler 324 may be associated with the second consumer 329, which may be a communication protocol, such as the Internet Small Computer System Interface ("iSCSI") encapsulation over RDMA ("iSER") protocol. The CQ handler 324 may be associated with the second consumer 329 through a completion handler identification, which may be a specific number (such as "2") that associates the CQ handler 322 or 324 with a CQ 318 or 320. If a CQE is created on the CQ 318 that corresponds to CQ handler 322, then the CQ handler 322 may send an interrupt signal to the processor 326. The processor 326 is able to determine the sender of the interrupt and/or type from the completion handler identification, which is the value "1." Likewise, if a CQE is created on the CQ 320 that corresponds to CQ handler 324, then the CQ handler 324 may send an interrupt signal to the processor 326. The processor 326 is able to understand that the sender of the interrupt and/or type from the completion handler identification, which is the value "2." Thus, the processor may receive multiple interrupts from multiple CQs 318 and 320 associated with the RNIC 315.

Because the QPs 318 and 320 may be associated with CQ handlers 322 and 324, the processors 326 or 328 may receive multiple interrupt signals from multiple CQs handlers 322 or 324 associated with the RNIC 315. As noted above, the use of multiple CQ handlers 322 or 324 allows the consumer 327 or 328 or operating system to utilize multiple interrupts or interrupt service routines. This allows processes, such as consumers 327 and 329, that are associated with a processor or group of processors, such as processors 326 and 328, to have a mechanism to ensure that certain processes are associated with a single processor or group of processors. Accordingly, the interrupts for a RNIC 315 may be distributed to multiple processors instead of using a single CQ handler with a single processor. This reduces the hardware/software complexity in dispensing interrupts and extra overhead resulting from cache coherency protocols, such as snoop and invalidation packets or data sloshing. The snoop and invalidation packets may result from different components, such as processors, trying to determine where the latest version of information stored is located in memory. Data sloshing results when the time associated with handling the snoop and invalidation packets interferes with the reading and writing of memory.

Figure 4:
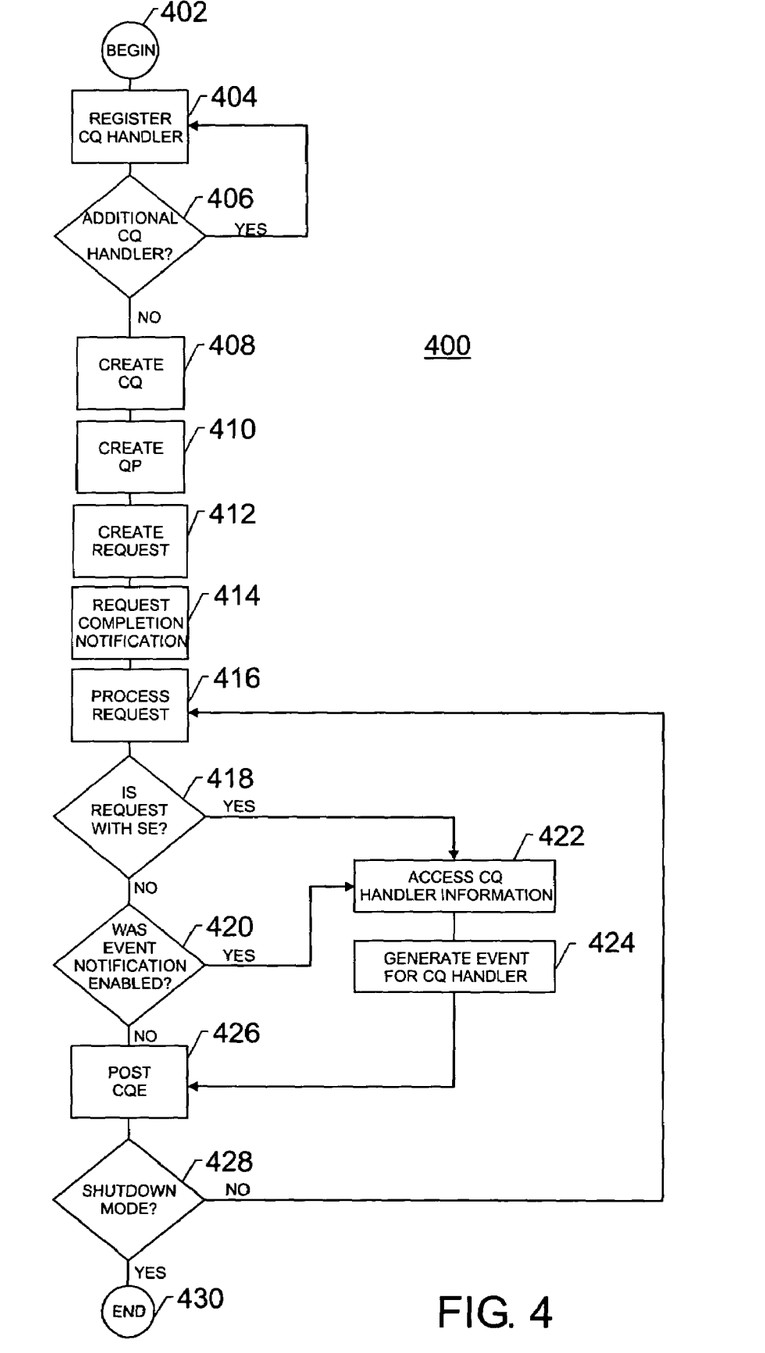
FIG. 4 is a process flow diagram showing the operation of a multiple CQ handlers in accordance with an embodiment of the present invention.

FIG. 4 is a process flow diagram showing the operation of a multiple CQ handlers in accordance with an embodiment of the present invention. The diagram is generally referred to by the reference numeral 400. The process shown in FIG. 4 illustrates the operation of multiple CQ handlers 322 and 324 (FIG. 3), which may be implemented and utilized by the RNIC 315 (FIG. 3) in the node 302 (FIG. 3). The process begins at block 402. At block 404, a CQ handler 322 or 324 may be registered. The registration process may create a unique CQ handler identification that relates to the specific CQ handler 322 or 324, which may be a specific address stored within the node 302. Then, at block 406, the RNIC 315 may determine if an additional CQ handler 322 or 324 is to be implemented. If an additional CQ handler 322 or 324 is to be implemented, then the additional CQ handler 322 or 324 may be registered, as shown at block 404. A verb, such as the "Query RNIC" verb discussed above, may be issued to determine the number of CQ handlers 322 and 324 that the RNIC 315 is able to support.

However, if no additional CQ handler 322 or 324 is to be implemented, then the RNIC 315 may create a completion queue ("CQ") or group of completion queues that may be associated with CQ handler 322 or 324, as shown at block 408. The CQ 318 or 320 may be created within a memory, such as 316 or 325, and associated with the node 302. As set forth above, the CQ 318 or 320 may be created automatically upon initialization of the node 302 or created by the execution of a verb or command, such as the "createCQ" or "modifyCQ" verbs, for example. The CQ 318 or 320 and the CQ handler 322 or 324 may be associated through the use of the CQ handler identification. Once the CQ 318 or 320 is created and associated with the CQ handler 322 or 324, a receive queue ("RQ") and/or a send queue ("SQ") may be created that may also be associated with the CQ 318 or 320 at block 410. At block 412, a work request request, such as a Post SQ or Post RQ, may be received for processing by the node 302. The work request may also include a request completion notification, as shown in block 414. The request completion notification may request the CQ handler be called when a completion queue entry ("CQE") of a specified type is added to the CQ 318 or 320.

When the request is received, at block 416, the RNIC 315 may determine the QP 312 or 314 that the request is associated with for further processing. The processing of the request may also include various validation steps throughout the processing of the request that verify the QP, the RNIC identifier, or CQ identifier, for example. The RNIC 315 may determine if the request includes a solicited event ("SE") at block 418. A SE is a facility that the sender of an RDMA operation may cause the generation of an event at a receiver, if the receiver is able to generate events. If the request includes a SE, then the CQ handler identification may be accessed from the appropriate CQ 318 or 320, as shown at block 422. However, if the request does not include a SE, then the CQ handler may determine if the request includes a request completion notification, as shown at block 420. If the request completion notification is enabled, then the CQ handler identification may be accessed from the appropriate CQ 318 or 320 at block 422. With the CQ handler identification, an event may be generated for the CQ handler 322 or 324 at block 424. The event may include information relating to the request. Once the event is generated, the CQE may be posted to the CQ 318 or 320, as shown at block 426. The notification may include sending an interrupt or signaling that the request has been executed, for example.

However, if the request completion notification is disabled, the CQE may be posted to the CQ 318 or 320 at block 426. Then the RNIC 315 may determine if the process is in a shutdown mode, as shown at block 428. If the RNIC is not in a shutdown mode, then the RNIC 315 may wait to process additional requests, as shown at block 416. However, if a shutdown mode is indicated, then the process may end at block 430.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A notification system, comprising:
   one or more processors;
   a plurality of completion queue handlers associated with a communication device, wherein a verb returns a number of the plurality of completion queue handlers that are associated with the communication device, each of the plurality of completion queue handlers associated with a process associated with a processor of the one or more processors; and
   at least one completion queue associated with each one of the plurality of completion queue handlers, wherein each of the plurality of completion queue handlers are segregated to target a specific one of the one or more processors, and wherein the segregation of the plurality of completion queue handlers is to reduce cache line invalidation, cache line eviction, and/or unnecessary memory bus overhead associated with synchronization of accesses to memory locations used by the plurality of completion queue handlers.

2. The notification system set forth in claim 1, wherein each of the plurality of completion queue handlers generates an interrupt to the processor associated with the process.

3. The notification system set forth in claim 1, wherein a verb modifies an association of the at least one completion queue associated with at least one of the plurality of completion queue handlers.

4. The notification system set forth in claim 1, wherein a verb creates the at least one completion queue associated with at least one of the plurality of completion queue handlers.

5. The notification system set forth in claim 1, wherein each of the plurality of completion queue handlers are associated with at least one completion queue through a completion queue handler identifier.

6. A network, comprising:
   a plurality of systems;
   a switch network that connects the plurality of systems for communication; and
   at least one of the plurality of systems, wherein the at least one of the plurality of systems comprises;
   one or more processors:
   a communication device having a plurality of completion queues and a plurality of completion queue handlers, wherein a verb returns a number of the plurality of completion queue handlers that are associated with the communication device; and
   at least two completion queue handlers associated with the communication device, wherein each completion queue handler is associated with one of a plurality of processes and associated with at least one of the plurality of completion queues, wherein a first of the at least two completion queue handlers is associated with one of the plurality of processes and a second of the at least two completion queue handlers is associated with another of the plurality of processes, wherein each of the at least two completion queue handlers are segregated to target a specific one of the one or more processors, and wherein the segregation of the at least two completion queue handlers is to reduce cache line invalidation, cache line eviction, and/or unnecessary memory bus overhead associated with synchronization of accesses to memory locations used by the at least two completion queue handlers.

7. The network set forth in claim 6, wherein the first of at least two completion handlers communicates a first interrupt to a first processor associated with one of the plurality of processes and the second of the at least two completion handlers communicates a second interrupt to a second processor associated with another of the plurality of processes.

8. The network set forth in claim 6, wherein a verb modifies the association of the first of at least two completion handlers with one of the plurality of processes.

9. The network set forth in claim 6, wherein the at least two completion handlers reside in memory in the communication device.

10. The network set forth in claim 6, wherein the at least two completion handlers reside in memory of at least one of the plurality of systems that is external to the communication device.

11. A method for providing notification to a plurality of processes, the method comprising the acts of:

executing a plurality of processes on a plurality of processors;

creating a plurality of completion queues on a communication device, each of the plurality of completion queues associated with at least one of a plurality of completion queue handlers that are associated with the communication device, wherein each of the plurality of completion queue handlers are associated with one of the plurality of processes, wherein the plurality of completion queue handlers are segregated to target a specific one of the plurality of processors, and wherein the segregation of the plurality of the completion queue handlers is to reduce cache line invalidation, cache line eviction, and/or unnecessary memory bus overhead associated with synchronization of accesses memory locations used by the plurality of completion queue handlers;

issuing a verb to return a number of the plurality of completion queue handlers that are associated with the communication device;

placing a completion queue entry on one of the plurality of completion queues;

invoking one of the plurality of completion queue handlers associated with the one of the plurality of completion queues; and notifying the one of the plurality of processes associated with the one of a plurality of completion queue handlers.

12. The method set forth in claim 11, wherein the notification comprises the one of the plurality of completion queue handlers sending an interrupt to one of the plurality of processors.

13. The method set forth in claim 11, comprising issuing a verb to create one of the plurality of completion queues.

14. The method set forth in claim 11, comprising modifying an association with the plurality of completion queue handlers through issuance of a second verb.

15. The method set forth in claim 11, wherein the creation of the plurality of completion queues comprises defining each of the plurality of completion queues in a memory.

* * * * *

UNITED STATES PATENT AND TRADEMARK OFFICE
CERTIFICATE OF CORRECTION

PATENT NO. : 7,404,190 B2
APPLICATION NO. : 10/664707
DATED : July 22, 2008
INVENTOR(S) : Michael R. Krause et al.

It is certified that error appears in the above-identified patent and that said Letters Patent is hereby corrected as shown below:

In column 10, line 27, in Claim 6, delete "comprises;" and insert -- comprises: --, therefor.

In column 10, line 28, in Claim 6, delete "processors:" and insert -- processors; --, therefor.

In column 11, line 17, in Claim 11, after "accesses" insert -- to --.

Signed and Sealed this

Twenty-fifth Day of August, 2009

David J. Kappos
*Director of the United States Patent and Trademark Office*